Jan. 25, 1944.   R. H. UPSON   2,340,237
CONTROL MECHANISM FOR AIRPLANES
Filed Oct. 6, 1941   3 Sheets-Sheet 1
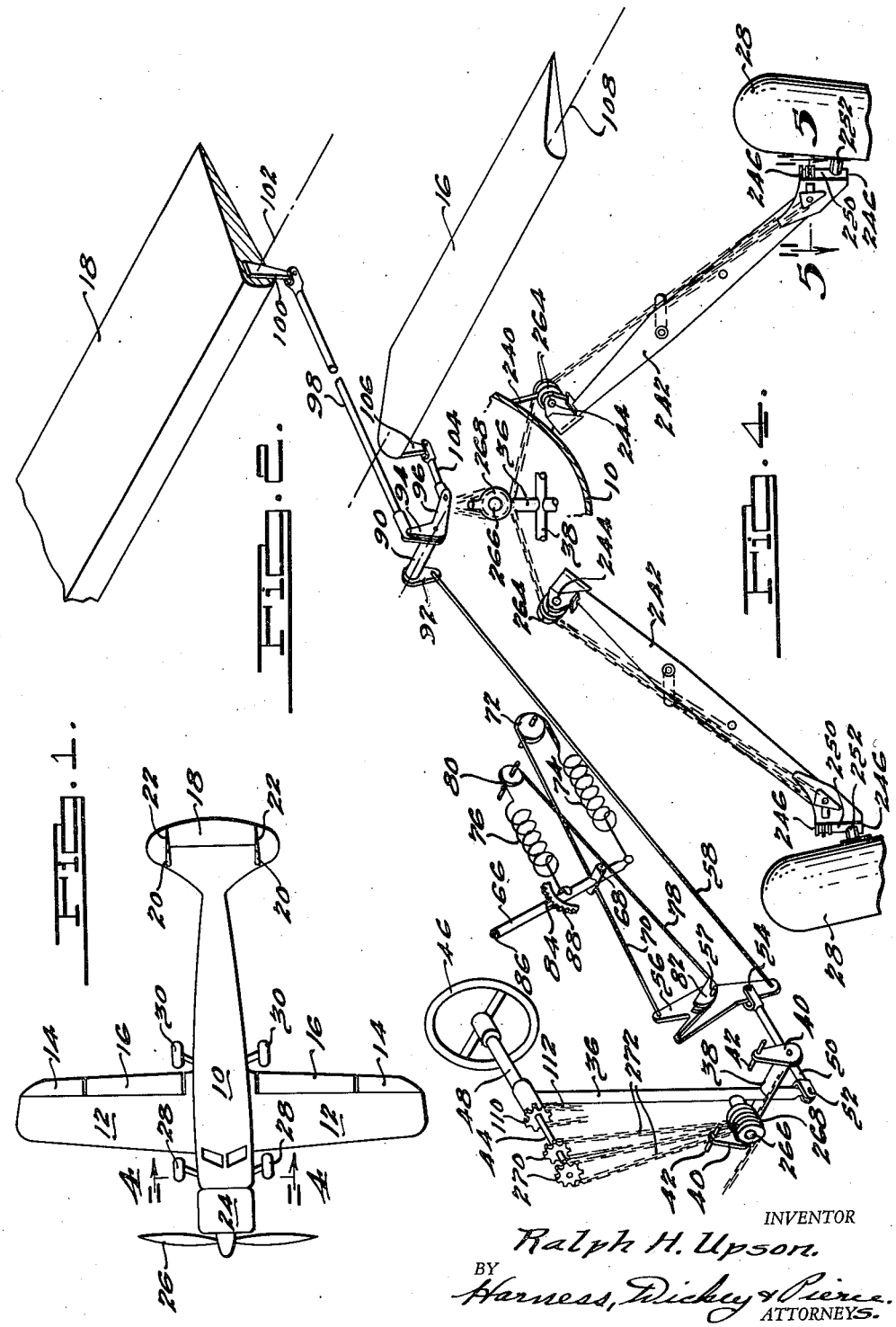
INVENTOR
Ralph H. Upson.
BY
Harness, Dickey & Pierce.
ATTORNEYS.

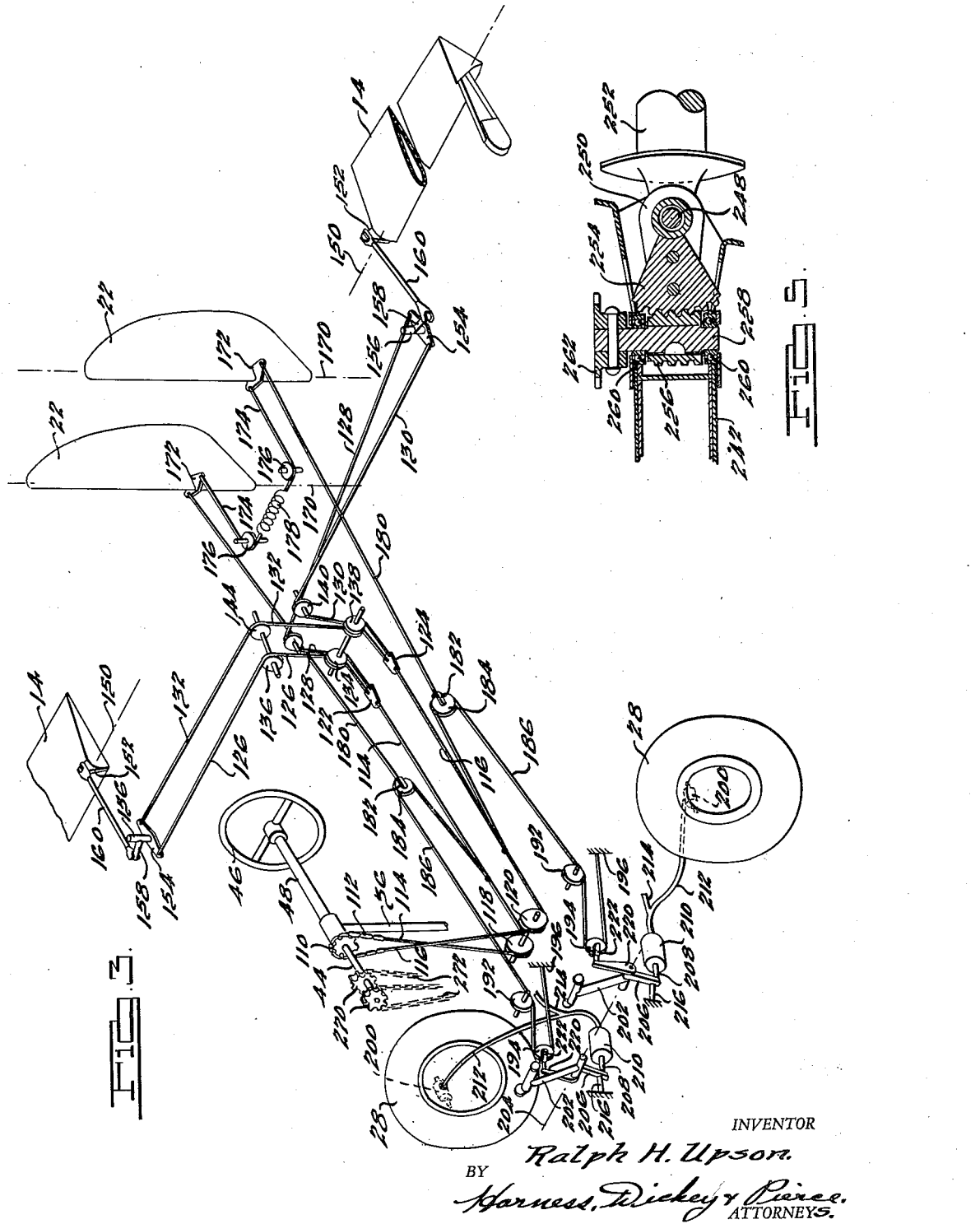

Jan. 25, 1944.　　　　R. H. UPSON　　　　2,340,237
CONTROL MECHANISM FOR AIRPLANES
Filed Oct. 6, 1941　　　3 Sheets-Sheet 3
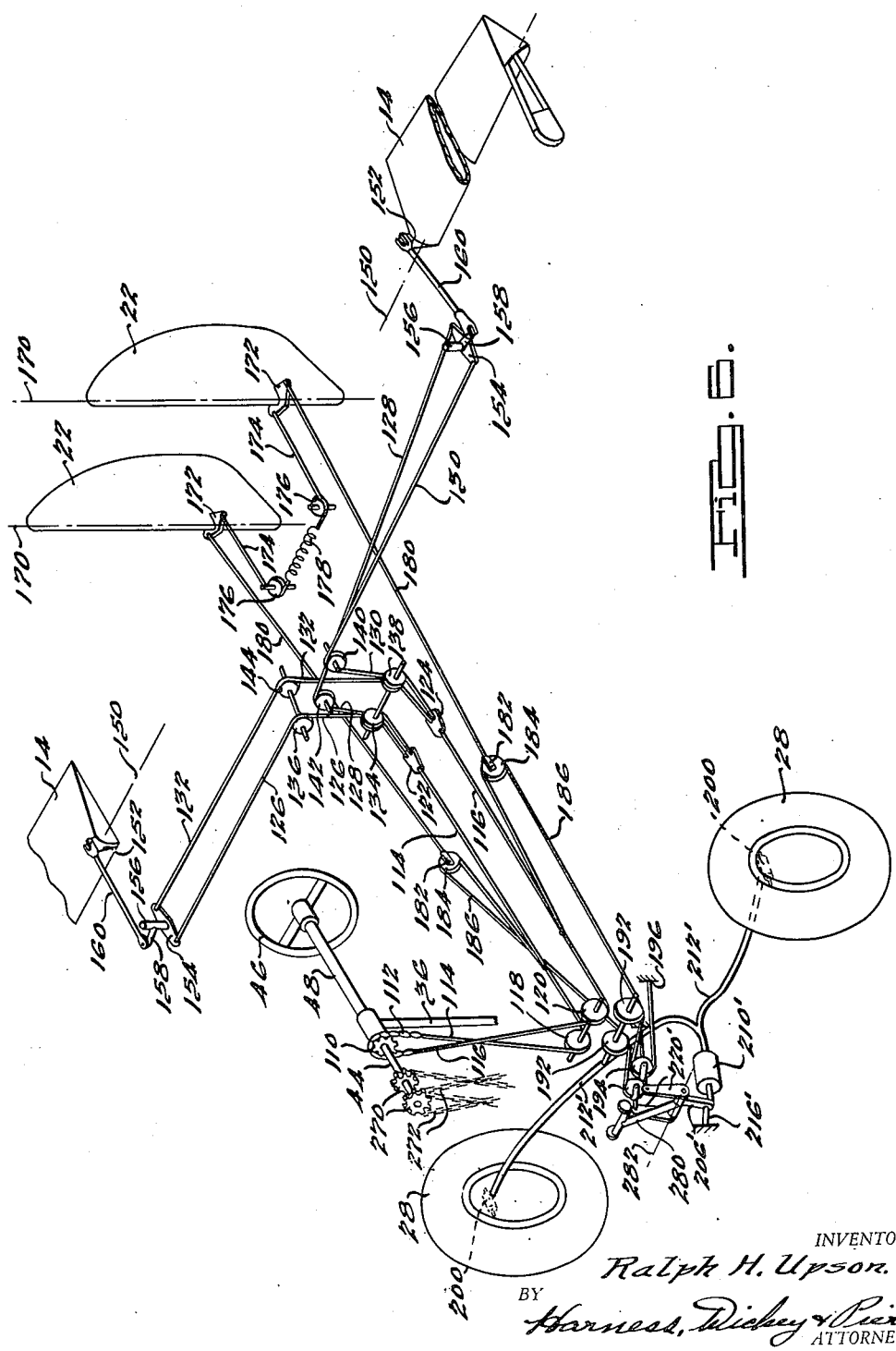
INVENTOR
Ralph H. Upson.
BY
Harness, Dickey & Pierce.
ATTORNEYS.

Patented Jan. 25, 1944

2,340,237

UNITED STATES PATENT OFFICE 2,340,237

CONTROL MECHANISM FOR AIRPLANES

Ralph H. Upson, Ann Arbor, Mich., assignor, by mesne assignments, to Consolidated Vultee Aircraft Corporation, a corporation of Delaware Application October 6, 1941, Serial No. 413,770

6 Claims. (Cl. 244—83)

This invention relates to airplanes and particularly to the control thereof both in flight and upon the ground and has for its principal object the provision of an airplane and control mechanism therefor that contributes to the ease and safety in the control of the airplane both during flight and when running on the ground, obtained primarily by an improved grouping of control functions as pertaining to lift, steering, and braking respectively.

Objects of the invention include the provision of an airplane having ailerons and wing flaps and rudder and elevator surfaces together with a control member or column therefor connected thereto in a new and novel manner; the provision of a construction as above described in which the control member or column carries a control wheel connected to the ailerons and rudder surfaces for the simultaneous control thereof by turning of the control wheel about its axis, and the column is connected to the flaps and elevator surfaces for the simultaneous control thereof by bodily shiftable movement of the column in a forwardly and rearwardly direction; the provision of an airplane as above described in which the rudder surfaces comprise a pair of laterally spaced and separate rudder elements connected together for correlated movement in a new and novel manner; the provision of a novel form of mechanism for use between the control member of an airplane and the elevator and flap surfaces thereof; and the provision of a new and novel form of mechanism for adjustably loading the vertical flight control surfaces of an airplane tending to bias them toward a predetermined pivotal position.

Other objects of the invention include the provision of an airplane having a landing gear including two front wheels together with means for controlling the position of the front wheels relative to the longitudinal axis of the airplane for the purposes of controlling the path of movement of the airplane on the ground; the provision of a construction as above described including a novel form of mechanism for controlling the steerable position of the ground wheels of an airplane; the provision of a construction as above described in which the brakes for the wheel or wheels on one side of an airplane are operable independently of the brakes for the wheel or wheels on the opposite side thereof; the provision of a construction as above described in which the wheel brakes are interconnected with the rudder means of the airplane whereby the actuation of the brake on one side of the airplane independently of the brakes on the opposite side thereof automatically actuate the rudder means to assist the brake means in turning the airplane while operating on the ground; the provision of a construction as above described in which the rudder means comprise a pair of separate rudders so constructed and arranged and connected with the brake control means that when all of the brakes are applied the rudders are swung in opposite directions to serve as wind brake means; the provision of a construction as above described in which the rudders are interconnected with the ailerons but are actuable independently of the ailerons during a braking application; and the provision of a control mecanism for airplanes that is simple in construction, efficient in operation and relatively economical to produce.

The above being among the objects of the present invention the same consists in certain novel features of construction and combinations of parts to be hereinafter described with reference to the accompanying drawings, and then claimed, having the above and other objects in view.

In the accompanying drawings which illustrate a suitable embodiment of the present invention and in which like numerals refer to like parts throughout the several different views, Fig. 1 is a plan view of an airplane including a suitable embodiment of the present invention;

Fig. 2 is an enlarged, more or less diagrammatic, fragmentary perspective view illustrating the control mechanism for the flaps and ailerons of the airplane shown in Fig. 1;

Fig. 2 is an enlarged, more or less diagrammatic, fragmentary perspective view illustrating the control mechanism for the flaps and ailerons of the airplane shown in Fig. 1;

Fig. 3 (sheet 2) is an enlarged, fragmentary, more or less diagrammatic perspective view illustrating the control mechanism for the rudders and ailerons and showing the connections between the steering wheels and the rudders and ailerons of the airplane shown in Fig. 1, together with the brake actuating means for the wheels;

Fig. 4 (sheet 1) is an enlarged fragmentary vertical sectional view taken approximately on the line 4—4 of Fig. 1 and illustrating the mechanism for controlling the steerable position of the front wheels;

Fig. 5 is an enlarged fragmentary horizontal sectional view taken on the line 5—5 of Fig. 4 and illustrating in greater detail the construction of that portion of the mechanism; and, Fig. 6 is a view similar to Fig. 3 but illustrating a modified form of brake mechanism and connection between the brakes and rudders.

The primary fault in the control system of the usual airplane, with respect to its use by novices, is the multiplicity of control functions that must be consciously coordinated to obtain best results. In this sense, although many of the controls are mechanically separable, they must be considered in combination with respect to their use. For example, in such an ordinary maneuver as a banked turn the pilot flying a conventional airplane must bank by means of the ailerons, at the same time applying the rudder to neutralize any skidding or slipping tendency, and if the turn is a sharp one he must simultaneously move the elevator upward in order to restore the turning component otherwise lost by reason of the banked position. This longitudinal turning component puts additional load upon the wings, which has frequently been known to result in a stall, the latter being likely to end in a spin particularly in case of poor coordination between the ailerons and rudder. With effective flaps this stalling tendency could be materially decreased by partial flap deflection in proper proportion to the increased loading on the wings; but when the flaps are operated by the usual separate control it is hardly feasible to use it for such a purpose even on the part of an expert, let alone a novice, flyer. On the other hand, if the proper movement of ailerons, rudder, elevator and flaps is automatically coordinated and handled by a single control the facility and safety of flying can be greatly improved, especially if various supplementary controls such as ground and air braking means can be similarly coordinated.

The present invention has for its purpose the provision of an airplane and particularly a control mechanism therefor that not only will enhance the ease of handling an airplane both during flight and during movement upon the ground but will also eliminate certain features in the control of airplanes as heretofore constructed which offer a source of danger, particularly in the hands of unskilled operators. To that end a single manually operated control member, preferably in the form of a steering or control wheel, is interconnected with the ailerons and rudder means for simultaneous movement thereof upon turning movement of the wheel, and connected to the flaps and elevator surface or surfaces for simultaneous and correlated movement upon bodily shiftable movement of the steering wheel in forwardly and rearwardly directions. The airplane is provided with brakes for the wheels thereof and the control for the brakes is interconnected with the rudder means for simultaneous and correlated movement therewith. As a further feature in the preferred embodiment the airplane is provided with two laterally spaced front wheels which are steerable and connected to the control wheel for simultaneous movement therewith upon turning of the control wheel. It will, of course, be appreciated that the present invention is applicable to airplanes of different designs and constructions, that is, whether the airplane is of a monoplane or biplane type, whether it is of the type having the tail surfaces carried by an extension of the fuselage or by booms projecting rearwardly therefrom, whether controlled by a wheel or stick, and regardless of other detail features so long as it is provided with flaps and ailerons and rudder and elevator surfaces. In a more limited sense the invention is applicable to a type of airplane provided with one or more steerable ground wheels and particularly where such ground wheels are the front wheels, and in a further limited sense where the airplane is provided with a pair of rudders. In a broad sense the term elevator is here used to denote any means of affecting the longitudinal trim or pitching motion of the airplane; the term flap denotes any means of altering the lift of the wing without changing the speed, altitude or angle of attack of the airplane as a whole; the term ailerons denotes any means of controlling the rotation of the airplane about its longitudinal axis; the term rudder denotes any means of controlling the rotation of the airplane about its vertical axis, and the term brake denotes any means of applying longitudinal drag to the airplane whether in the air or on the ground.

With the above in mind and now referring to the accompanying drawings, in Fig. 1 is illustrated an airplane of the monoplane type having a fuselage indicated generally at 10 and oppositely disposed wings 12 each provided with an aileron 14 and a flap 16 pivotally mounted on the trailing edge thereof in a conventional manner. The fuselage 10 extends rearwardly and at its rear end pivotally supports thereon in a conventional manner an elevator surface 18 and a pair of laterally spaced vertically upwardly projecting fins 20 each pivotally supporting for movement about a vertical line at its rear edge a rudder 22. An engine (not shown) is mounted on the forward end of the fuselage 10 and enclosed in a conventional cowling 24 and is drivingly connected to a propeller 26 in a conventional manner. In accordance with a preferred form of the present invention the airplane is provided with a pair of laterally spaced front ground wheels 28 and a pair of laterally spaced rear ground wheels 30 suitably connected to the fuselage 10.

One pair of the wheels 28—30 are mounted for steering movement to enhance the control of the direction of movement of the airplane on the ground, and preferably these are the front wheels 28 in accordance with a more limited phase of the present invention. Preferably all of the wheels 28—30 are provided with braking means of suitable or conventional construction but in accordance with the present invention controlled in a novel manner which will hereinafter be more fully described. To enable the pilot to control the various control surfaces of the airplane a vertically directed lever or control column 36 is mounted in the cockpit for pivotal movement in a vertical plane about a horizontal axis. As best illustrated in Fig. 2 the column 36 is provided with a cross-bar 38 fixed thereto a short distance above the lower end thereof and each end of the cross-bar 38 in turn has fixed thereto a link 40 which extends upwardly therefrom. The links 40 are connected by suitable pivot pins such as 42, arranged with their axes aligned and in a horizontal plane extending spanwise of the airplane, to a suitably fixed part of the fuselage, thereby mounting the column 36 for the movement described. At its upper end the lever 36 rotatably supports therein the push and pull shaft 44 which is arranged with its axis in a vertical plane parallel to the longitudinal center line of the airplane and preferably in approximately perpendicular relationship with respect to the axis of the column 36. The shaft 44 is, of course, held against axial movement relative to the column 36. At its rear end the shaft 44 has fixed thereto a steering or control wheel 46. A suitable housing 48 fixed to the upper end of the column 36 preferably encloses the shaft 44 between the column 36 and the control wheel 46. The column 36 is thus mounted for pivotal movement about the pins 42 and its pivotal movement may be controlled by the operator grasping the control wheel 46 and pushing it forwardly or pulling it rearwardly from a central or neutral position. Turning of the wheel 46 rotates the shaft 44 as will be appreciated.

The bifurcated forward end of a link 50 is pivotally connected as at 52 to the lower end of the column 36 at a material distance below the axis of the pivot pins 42. The rear end of the link 50 is also bifurcated and pivotally secured thereto as at 54. Within such bifurcation is a plate-like member 56 which projects both below and above its pivotal connection 54 with the link 50. The plate member 56 is pivoted by pins as at 57 approximately midway its height about a fixed horizontal axis extending spanwise of the airplane. A push-pull rod 58 has one end thereof secured to the lower end of the member 56 and extends rearwardly therefrom and is connected to the lower end of a horn member 92. The horn shaft 90 being rotatable about a fixed axis, it will be appreciated that pivotal movement of the column 36 about the axis of its pivot pins 42 causes pivotal movement of the plate member 56 about the pivot 57 and similar movement of the horn 92. Means are provided in accordance with the present invention tending to bias the member 56 in either direction of rotation about its pivotal axis 57 and to effect this result the following construction is provided. Rearwardly of the member 56 a hand lever 66 is mounted for pivotal movement about a horizontal, spanwise directed pivotal axis 68 located between its ends. A cable 70 connected to the upper end of the member 56 extends rearwardly therefrom and passes over a sheave 72 rotatable about a fixed axis and is then connected to the rear end of a tension spring 74 the forward end of which is connected to the lower end of the lever 66. The tension of the spring 74 thus constantly acts upon the member 56 tending to rotate it in a clockwise direction of movement, as viewed in Fig. 2, about its pivot point 57. A second tension spring 76 is connected at its forward end to the lever 66 above the pivot point 68 of the latter and at its rear end is connected to a cable 78 which passes over a sheave 80 rotatable about a fixed axis and then extends forwardly where it is connected to the upper end of the member 56 but at a point forwardly of the point of connection with the cable 70 therewith. In thus passing forwardly the cable 78 passes under a convexly curved block 82 fixed to the side of the plate member 56 and arranged with its curved face directed downwardly and forwardly. The block 82 is so arranged that the pivotal axis 57 of the plate member 56 lies within or at least close to the curve of the block 82 so that the effective point of connection of the cable 78 and the plate member 56 is slightly below the pivotal axis of the latter when the column 36, and therefore the plate member 56, are in their normal or neutral positions. The pivot 57 is, however, in relatively close proximity to the curved face of the block 82 and the curvature of the block is much greater than that of a circle of a radius equal to the shortest distance of the curved face of the block from the pivot point 57, so that the effective point of connection of the cable 78 with the plate member 56 moves downwardly and away from the pivotal axis 57 when the plate member 56 pivots in a counterclockwise direction of movement materially away from its normal or neutral position as shown. It will thus be appreciated that the force of the springs 74 and 76 act on the plate member 56 to tend to turn it in opposite directions of rotation. The spring 74 being directly connected to the upper end of the plate member 56 acts through a greater leverage on the plate member 56 than the spring 76 and consequently where the springs 74 and 76 exert the same pull the spring 74 exerts a superior turning force on the plate member 56. The force of the spring 76 with the arrangement described is, of course, at a minimum when the plate member 56 is in its normal pivotal position shown but, as will be appreciated, its effect is increased whenever the plate member 56 is pivoted in a counterclockwise direction of rotation as viewed in Fig. 2 beyond its normal or neutral pivotal position shown. Preferably the curvature of the curved face of the block 82 is such as to increase the effective pull of the spring 76 on the plate member 56 along a parabolic curve as the plate member rotates in a counterclockwise direction of movement from the position shown.

For the purpose of simplicity in description and drawings the plate member 56 is shown connected by the rod 58 with the elevator 18 and only one of the ailerons 16, it being understood that equivalent means may be employed for connecting the plate member 56 to the remaining flap, and the preferred method of accomplishing this will be later described. While the control column 36 may be connected to the elevator 18 and flap 16 in any suitable manner to provide simultaneous movement of these control surfaces in opposite directions of rotation as previously mentioned, one suitable method which is shown in Fig. 2 by way of illustration is as follows.

The outer end of the shaft 90, linked to the control column 36 by means already described, has fixed thereto a bellcrank including an upwardly extending arm 94 and a downwardly and rearwardly extending arm 96. The upper free end of the arm 94 is connected by a rod or link 98 with the free end of a horn 100 fixed to the elevator 18 and projecting downwardly below the pivotal axis 102 thereof. The free end of the arm 96 is connected by a link 104 with the lower free end of a horn 106 fixed to the flap 16 and extending downwardly below the pivotal axis 108 thereof.

With this construction it will be appreciated that when the control column 36 is pulled rearwardly by the pilot the plate member 56 will be caused to rotate in a clockwise direction of rotation as viewed in Fig. 2 thus causing the rod 58 to move forwardly, thus rotating the shaft 90 in a direction to move the upper end of the bellcrank arm 94 rearwardly and the lower end of the arm 96 thereof downwardly and forwardly, this movement of the bellcrank causing the elevator 18 to rotate in a counterclockwise direction as viewed in Fig. 2, that is to raise its trailing edge, and causing the flap 16 to rotate in a clockwise direction of rotation as viewed in Fig. 2, that is to lower its trailing edge. Conversely if the control column 36 is pushed in a forwardly direction the consequent movement of the related parts as above described will cause the trailing edge of the elevator 18 to be depressed and the trailing edge of the flap 16 to be raised.

It will be noted that because of the fact the horn 100 on the elevator 18 extends perpendicularly with respect to the general plane of the elevator 18 and the arm 94 of the bellcrank is arranged in substantially parallel relation with respect to the length of the horn 100, initial movement of the control column 36 or wheel 46 either forwardly or rearwardly from its normal or neutral position will effect a maximum pivotal movement of the elevator 18. On the other hand, because the arm 96 of the bellcrank extends not only downwardly and rearwardly and the horn 106 on the flap 16 is arranged in approximately perpendicular relationship with respect to the general plane of the flap 16, when the control wheel 46 is pushed forwardly, as for instance to put the plane into a dive, a relatively minor amount of pivotal movement will be imparted to the flap 16 and the relative amount of pivotal movement of the flap 16 as compared to the pivotal movement of the control column 36 will decrease as the control column 36 is pivoted forwardly out of its neutral position. On the other hand, if the control wheel 46 is pulled rearwardly from its normal position the initial downward movement of the flap 16 will be relatively small but as the pivotal movement of the control column 36 continues rearwardly from its normal or neutral position the arm 96 will more nearly approach a vertical position and thus will increase the relative pivotal movement of the flap 16 with respect to the corresponding pivotal movement of the control column 36. This arrangement of parts provides a construction in which when the control column is moved to cause the airplane to descend the flap 16 will move very slightly out of its normal or neutral position. When the control column 36 is moved to raise the elevator 18, as occurs as an incident to normal flight or when it is desired to cause the airplane to climb, then the flap 16 will be depressed only slightly during the first movements of the control column in this direction, so as to offer very little added drag at those times of movement of the elevator 18 is required for normal flying control, but will be depressed to a rapidly increasing extent when the control column 36 is pivoted rearwardly out of its neutral position to the extent required for instance in landing or in similar conditions requiring increased lift and drag of the wings. This particular inter-relation of relative movements of the elevator and flap forms no part of the present invention but does form part of the subject-matter of my co-pending application for Letters Patent of the United States for improvements in Airplane, filed July 18, 1941, and serially numbered 403,047. The combination of such a flap control with separately operable aerodynamic brakes or air drag means is, however, new and important because when flap deflection is made a normal part of the routine control it should obviously be designed to offer a minimum of drag. Yet for some conditions, such as landing over obstructions, high drag is desired. Hence, instead of the high-drag flap commonly used, this invention employs a low-drag flap, and separate drag control, preferably using the rudders for this purpose as will later be made clear.

In the case of two flaps being used, the remaining flap, similar to 16, on the opposite side of the airplane may be controlled by providing an extension of the shaft 90 having an arm or lever equivalent to the arm 96 connected to such flap in the same manner as the flap thus described. As will be appreciated the remaining flap will thus, or by any equivalent means, be caused to move in exact accordance with the movement of the flap 16 first described.

From the description of the control of the flaps 16 and elevator 18 above given the effects of the bungee springs 74 and 76 on such control will now be more apparent. In the main it will be appreciated that the combined effect of these springs is to urge the various connections towards a position in which the trailing edge of the flaps 16 will be depressed. It will, of course, be appreciated that when the trailing edges of the flaps 16 are depressed the force of the wind flowing against the under surfaces thereof as well as the suction exerted against the upper surface thereof is in a direction tending to move the flaps more nearly into alignment with the associated wing, and such force must be resisted by the pilot through the control column 36. By the use of a bungee spring or springs the load thus imposed on the pilot may be materially reduced.

It would, of course, be undesirable to so arrange such bungee spring or springs that when the plane is in normal flight the pilot would be required to exert a material effort to maintain the flaps in aligned relation with respect to the wings. For that reason, in accordance with the present invention, the anchorage for the bungee springs 74 and 76 is made adjustable so that the effect thereof on the flaps may be varied to suit particular conditions of flight. For instance, where a pilot is about to land the plane, under which conditions he will desire the flaps 16 to be depressed to a maximum amount, he may operate the lever 66 to pivot it in a clockwise direction of rotation as viewed in Fig. 2 to thereby increase the tension of the spring 74 and decrease the tension of the spring 76, the tension of the spring 74 thus being increased to aid the pilot in maintaining the trailing edge of the flaps 16 depressed. In normal flight the pilot may adjust the lever 66 to so proportion the respective forces of the springs 74 and 76 on the plate member 56 as to tend to maintain the pivotal positions of the flaps 16 in a desired relation with respect to the general plane of the associated wings, but at the same time permitting the full desired range of control without the exertion of excessive manual force even when the adjustment of lever 66 remains unchanged. Whether movement of the flaps 16 under such conditions is desired or not, when the pilot operates the control column 36 to move the trailing edge of the elevator upwardly, the force of the spring 74 decreases; but the force of the spring 76 tends to increase and would put an excessive restraint on the pivotal movement of plate member 56 were it not for the decreasing lever arm afforded by the curved block 82. Conversely, when the trailing edge of the elevator 18 is depressed and the force of the spring 74 is increased under such circumstances, the force of the spring 76 is decreased, but its turning moment on the plate member 56 is affected to a relatively minor extent as under such conditions the effective arm of the spring force is increased by the rotation of the block 82.

From the above it will be appreciated that in accordance with the invention means are provided for controlling the elevator and flaps in correlated relation, and means are provided so that the pilot may offset to a large extent the pressure of the air acting upon the flaps, when they are in depressed condition, tending to move them into alignment with their associated wings, and such that the forces resisting movement of the flaps from a desired adjusted position is more or less automatically compensated for when the flaps are moved out of such position through operation of the control column.

The control for the ailerons and rudders is illustrated in Fig. 3. As there indicated, the shaft 44 immediately forwardly of the control column 36 is provided with a sprocket 110 fixed thereto. Trained over the sprocket 110 is a chain 112. One end of the chain 112 is connected to the end of a flexible cable 114 and the opposite end of the chain is connected to the end of a flexible cable 116. The cables 114 and 116 extend downwardly from the sprocket 110 and cross each other, the cable 114 passing under a sheave 118 and the cable 116 passing under a sheave 120. The cable 114 extends rearwardly and is connected to a plate 122 and the cable 116 extends rearwardly in approximately parallel relation with respect thereto and is there connected to a similar plate 124. Connected to and extending rearwardly from the plate 122 are a pair of cables 126 and 128 and connected to and extending rearwardly from the plate 124 are a pair of cables 130 and 132. The cables 126 and 128 pass under a double sheave 134 and then extend upwardly therefrom, the cable 126 then passing over a sheave 136 and then in a spanwise direction to the left as viewed in Fig. 3. The cables 130 and 132, similar to the cables 126 and 128, pass under a double sheave 138 and then extend upwardly, the cable 130 passing over a sheave 140 corresponding to the sheave 136 and then spanwise of the airplane in the opposite direction from the cable 126. The cable 128 extends upwardly from the sheave 134 and then over a sheave 142 and then in the same general direction as the cable 130. The cable 132 extends under the sheave 138 and then upwardly over a sheave 144 and then in the same direction as the cable 126.

Each aileron 14 is pivoted for movement about an axis 150 and each aileron at its inner end is provided with an upstanding horn 152 fixed thereto. Forwardly of the inner end of each aileron 14 a double armed lever 154 is pivotally mounted on the associated wing 12 for movement about a vertical axis fixed with respect to such wing. Each lever 154 is provided with an upwardly extending hub portion 156 to which is fixed an outwardly extending arm 158 arranged in generally perpendicular relationship with respect to the longitudinal center line of the lever 154 but preferably forwardly inclined with respect thereto as indicated. The outer or free end of each arm 158 is connected by a link 160 with the free end of the horn 152 on the corresponding aileron 14. The outer end of the cable 126 is fixed to the outer end of the forwardly extending arm of the corresponding double armed lever 154 and the corresponding end of the cable 132 is fixed to the free end of the rearwardly projecting arm of the same double armed lever 154. Similarly the outer free end of the cable 130 is fixed to the outer free end of the forwardly extending arm of the double armed lever 154 on the right as viewed in Fig. 3, and the corresponding end of the cable 128 is fixed to the free end of the rearwardly projecting arm of such double armed lever.

With the above described arrangement it will be appreciated that turning of the control wheel 46 will cause rotation of the sprocket 110 and consequent longitudinal travel of the cables 114 and 116 in opposite directions, such movement of the cable 114 being imparted to the cables 126 and 128 and such movement of the cable 116 being imparted to the cables 128 and 130. The movement of these cables will cause rotation of the double armed levers 154 in opposite directions and the latter, being connected as described to the ailerons 14, will cause them to be pivoted about their axes 150 in opposite directions of rotation. In view of the fact that the cables 114 and 116 are crossed, rotation of the steering wheel 46 in a counterclockwise direction of rotation as viewed by the pilot operating the same will thus cause a depression of the righthand aileron 14, as viewed by the pilot, and raising of the righthand aileron 14. Conversely, movement of the steering wheel 46 in the opposite or clockwise direction of rotation will cause the lefthand aileron 14 as viewed by the pilot to be depressed and the righthand one thereof to be raised. By inclining the arms 158 in a backward direction, it will be appreciated that there will be a greater raising movement of one aileron than there will be a depressing movement of the opposite aileron for an equal movement of the control wheel 46 under the above described circumstances.

The rudders 22, as previously explained, are laterally spaced from one another and each is mounted for rotation about a corresponding fixed vertical axis 170. Each rudder 22 has fixed thereto near its axis a laterally projecting double horn 172. The inner arm of each horn 172 has fixed thereto a cable 174, and each cable 174 extends forwardly and around a sheave 176. After passing over the sheave 176, the forward ends of the cables 174 are connected to the opposite ends of a tension spring 178 which thus serves with the cables 174 to operatively interconnect the two rudders 22. The spring 178 is maintained constantly under a tension in order to maintain the operativeness of the rudder control as will hereinafter be more apparent.

The free end of each outer arm of the double armed levers 172 has fixed thereto the rear end of a forwardly extending cable 180, the forward end of each of which is fixed to a yoke 182 between the arms of which a sheave 184 is rotatably supported. A cable 186 is trained over each of the sheaves 184. One end of the cable 186, to the right as viewed from the pilot's seat, is fixed to the cable 114 rearwardly of the sheave 118, and the corresponding end of the cable 186, to the left as viewed from the pilot's seat, is correspondingly fixed to the cable 116. On the opposite side of the sheaves 184 each cable 186 extends forwardly each under a corresponding sheave 192, then over a corresponding sheave 194 from which it turns rearwardly and its end is fixed to a suitable point of anchorage such as 196 and which may be of any suitable part of the fuselage of the airplane.

For the moment it may be assumed that the sheaves 194 are mounted to rotate about a fixed axis in which case it will be appreciated that when the control wheel 46 is turned to cause lower runs of the cables 114 and 116 to move longitudinally of the airplane in opposite directions, such movement of the cables 114 and 116 will cause an equal movement of those ends of the cables 186 fixed thereto and will, therefore, vary the positions of the sheaves 184 longitudinally of the airplane and in opposite directions of movement. Movement of one sheave 184 in one direction and the other in the opposite direction acts through the cables 180 to turn the rudders 22 in a similar direction of rotation about their pivotal axes 170. For instance, when the hand wheel 46 is turned in a clockwise direction of movement as viewed from the pilot's seat, as previously explained the lower run of the cable 116 will move rearwardly and that of the cable 114 forwardly, causing the righthand aileron 14 as viewed from the pilot's seat to be lifted and the lefthand aileron 14 to be depressed. The forward movement of the cable 114 and rearward movement of the cable 116 under such conditions will pull the righthand sheave 184 as viewed from the pilot's seat forwardly and will permit the lefthand one thereof to move rearwardly, thus causing the rear edges of the rudders 22 under such circumstances to swing to the pilot's right, thus cooperating with the ailerons 14 to turn the plane to the right. The reverse of such movements will, of course, occur when the control wheel 46 is turned in a counterclockwise direction of rotation as viewed from the pilot's seat. It will, of course, be appreciated that when one of the cables 180 is thus pulled and the rudder on the same side deflected outwardly, the tension of the spring 178 acting through the cables 174 will turn the opposite rudder inwardly and take up the cable slack that would otherwise form on that side.

The front wheels 28 and the rear wheels 30, if desired, are equipped with suitable brakes. While the particular type of brakes employed is unimportant as far as the present invention is concerned, it is assumed in the present case for the purpose of illustration that the brakes are of the conventional hydraulically actuated type wherein a wheel cylinder 200 is carried by each wheel and is actuable to expand the braking elements for such wheel. The wheel cylinders 200 are, of course, expanded through the medium of a master cylinder mechanism actuated by a pedal mechanism under the control of the pilot and, in the broader aspects of the invention, an individual pedal and a master cylinder may be provided for the brakes on each side of the airplane as illustrated in Fig. 3 or a single pedal and single master cylinder may be provided for all of the brakes as illustrated in Fig. 6, or a single master cylinder may be equally operable by either or both of two pedals.

In the construction illustrated in Fig. 3, two laterally spaced brake pedals 202 are mounted for pivotal movement about an axis 204 fixed with respect to the airplane and extending horizontally spanwise of the airplane. Each pedal 202 has a downwardly extending arm 206 which is connected with the push rod 208 of the corresponding master cylinder 210. Each master cylinder 210 is provided with a conduit 212 connecting it with the wheel cylinder 200 for the front wheel on the corresponding side of the airplane. If it is desired that the rear wheels 30 also be braked, then a branch such as 214 for each conduit 212 may be extended to the wheel cylinder for the wheel 30 on the corresponding side of the airplane as will be readily appreciated. A suitable stop, such for instance as 216, is preferably associated with each brake pedal 202 as by engagement with the downward extending arm 206 thereof, as shown, to limit the rearward movement of the upper end of each pedal 202. As will be appreciated, by the arrangement shown and described the brakes on either side of the airplane may be actuated by depressing the corresponding pedal 202 therefor, or all of the brakes may be simultaneously actuated by simultaneously depressing both pedals 202.

In accordance with one phase of the present invention each brake pedal 202 has fixed for rotation therewith an upwardly extending arm 220 the upper end of which carries a yoke 222 within the corresponding sheave 194 previously described is rotatably mounted. When the brake pedals 202 are in their inoperative or rearward positions the sheaves 194 are thus anchored against rearward movement. Thus for all normal control movements of the ailerons 14 and rudders 22 during flight, the sheaves 194 may be assumed to rotate about fixed axes and the correlated movements of the ailerons 14 and 22, as previously described, upon rotation of the control wheel 46 results.

However, it will be appreciated that when one of the pedals 202 is depressed independently of the other, it will draw its corresponding sheave 194 forwardly and in so doing will act through its corresponding cable 186 to draw the corresponding sheave 184 forwardly and thereby pull the corresponding cable 180 forwardly without, however, resulting in any longitudinal movement of the remaining cable 180. Under such conditions the cable 180 which is drawn forwardly will serve to rotate the corresponding rudder 22 about its axis 170, the spring 178 stretching under such conditions to permit such pivotal movement of the one rudder without a corresponding movement of the other. For instance, if the righthand pedal 202 as viewed from the pilot's seat is depressed the rudder 22 on the corresponding side of the airplane will be swung to bring its trailing edge outwardly away from the center line of the airplane. This is of advantage when the airplane is rolling on the ground for in such case the braking of the righthand wheel or wheels only will ordinarily be for the purpose of turning the airplane to the right and such movement of the righthand rudder 22 will assist such turning movement under such conditions. The reverse of the above described operations will, of course, be true. In other words, if the lefthand brake pedal 202, as viewed from the pilot's seat, is depressed instead of the righthand brake pedal, the rudder 22 on the lefthand side of the plane as viewed from the pilot's seat will swing outwardly or to the left under such conditions with simultaneous braking of the wheel or wheels on the lefthand side of the airplane.

If both brake pedals 202 are depressed simultaneously, then both cables 180 will be pulled forwardly and both rudders 22 will be swung outwardly, this movement of the rudders in such case conditioning the rudders to act as air brakes cooperating with the wheel brakes to assist in bringing the airplane to a stop. Under some circumstances, as for example to control the glide path or restrict diving speed, such braking effect on the airplane in flight is desirable, under which conditions simultaneous depressing of both of the brake pedals 202 will swing both rudders 22 outwardly to effect this result.

It wil also be appreciated that the depression of either one or both of the brake pedals 202 will have no effect on the positions of the ailerons 14 for any constantly held rotatable position of the control wheel 46. Turning of the control wheel 46 not only will cause the usual movement of the ailerons 14 but will also act to turn the rudders 22 in a direction as determined by the direction of rotation of the control wheel 46 from the position initially determined by the depression of the pedal or pedal 202 and in a direction corresponding to that which would normally occur by operation of the control wheel 46 only. In other words if one brake pedal 202 is depressed to cause the corresponding rudder 22 to swing outwardly and then the control wheel 46 is turned, the remaining rudder 22 will turn as under normal circumstances while the rudder first actuated by the depression of the pedal will turn in a corresponding direction from the position initially determined by the application of the brake pedal. Depressing one pedal, however, will introduce a force in the control system tending to bias the control wheel in a direction opposite to the initial rudder application. If both brake pedals have been depressed and the hand wheel 46 is rotated, both of the rudders will be turned from the position initially determined by the application of the brake pedals in the direction determined by the movement of the control wheel 46. Accordingly, even though both brake pedals are depressed during flight a measure of lateral control still remains through turning of the control wheel 46, not only from the movement of the ailerons 14 but also, through movement of the rudders 22 themselves.

The ground wheels 28 and 30 may be mounted on the airplane in any conventional manner but in accordance with a further phase of the present invention the front wheels 28 are made steerable so as to facilitate controlling of the movement of the airplane on the ground. One suitable method for accomplishing this is illustrated in Figs. 2, 4 and 5 from which it will be noted that the fuselage 10 adjacent the forward end thereof is provided at each side thereof with a bracket 240 fixed thereto. A leg 242 is pivotally secured at its upper end to each bracket 240 by means of a pivot pin 244 and extends downwardly and laterally outwardly therefrom. Any suitable or conventional type of yieldable means may be provided for urging the legs 242 towards their normal position or otherwise to enable the legs 242 to absorb shock upwardly upon impact of the wheels with the ground or the like.

The lower end of each leg 242 is provided with a pair of outwardly directed vertically spaced portions 246 between which extends and to which is fixed a vertically directed pivot pin 248, best shown in Fig. 5. Rotatably mounted upon each pivot pin 248 between the corresponding portions 246 is a knuckle member 250 and each knuckle member 250 is provided with an outwardly directed spindle 252 upon which the corresponding wheel 28 is rotatably mounted. As best illustrated in Fig. 5 each knuckle member 250 has fixed thereto an inwardly extending form wheel segment 254. The worm wheel segment 254 lies in mesh with a worm 256 fixed to a shaft 258 projecting horizontally in a forwardly and rearwardly direction through the lower end of the corresponding leg 242 and is rotatably mounted in such leg by bearings 260 carried thereby. The rear end of each shaft 258 projects rearwardly from the corresponding leg 242 and has fixed thereto the sprocket 262. It will be appreciated that by rotating the sprocket 262 the associated worm 256 will be rotated and acting through the cooperating worm wheel segment 254 will turn the corresponding knuckle member 250 and consequently moves the corresponding wheel 28 in a steering direction about the axis of the associated pin 248. As shown in Fig. 4 the pivot pin 244 connecting each leg 242 with its bracket 240 also serves to support thereon a pair of sheaves 264.

As best illustrated in Figs. 2 and 4 the control column 36 a short distance above the crossbar 38 thereof has fixed thereto a forwardly projecting pin 266 upon which four sheaves 268 are rotatably mounted. The shaft 44 forwardly of the sprocket 110 thereon has fixed thereto a pair of sprockets 270. Over each sprocket 270 an endless chain 272 is trained. As illustrated in Figs. 2 and 4 the chain 272 trained over the forward sprocket 270 passes downwardly with the runs thereof passing under the two forward sheaves 266 and then to the right, as viewed from the pilot's seat, over the lefthand sheaves 264 illustrated in Fig. 4, and then downwardly over the sprocket 262 at the lower end of the lefthand leg as viewed in Fig. 4. Similarly the chain 272 trained over the rearwardmost sprocket 270 extends downwardly under the two rearmost sheaves 268, then over the righthand sprocket 264 as viewed in Fig. 4 and then over the sprocket 262 at the lower end of the righthand leg illustrated in Fig. 4. By this arrangement the sprockets 270 are connected with the sprockets 262 and the operativeness of the connection is maintained regardless of pivotal movement of the legs 242 about their pivot pins 244 and regardless of pivotal movement of the control column 36 about its pivotal axis 42. The arrangement is, of course, such that when the control wheel 46 is turned in a clockwise direction of rotation as viewed from the pilot's seat the wheels 28 will be turned to direct the airplane to the right, and when turned in a counterclockwise direction of rotation will be turned to direct the airplane to the left, in a manner similar to the results obtained by turning the steering wheel of the motor vehicle.

The above described movement of the front wheels 28 for steering purposes is, of course, automatically tied in with the movement of the ailerons 14 and rudders 22 for controlling the lateral direction of movement of the airplane ni flight. The same movement of these surfaces, with or without aid through braking of the wheels on one side of the airplane or the other, are of advantage in controlling the direction of movement of the airplane on the ground. Thus the turning of the front wheels 28 is of no disadvantage during flight, and the turning of the ailerons and rudders is an advantageous adjunct of the steering movement of the front wheels 28 when the airplane is running along the ground.

The consideration of wheel arrangement is also tied in with the longitudinal control coordination previously described. The so-called tri-cycle gear, with a single wheel forward, in its usual arrangement has its main or rear wheels only slightly behind the center of gravity of the airplane. This is because in taking off with the normally controlled airplane it is necessary for lift to depress the tail, thus rotating the entire airplane around its rear wheel contact line. With the coordinated flap and elevator movement on the other hand, enough lift at the moment of take-off can be had by means of the flap deflection alone, to justify placing the main wheels substantially further back than would otherwise be feasible. Were it not for this or some equivalent means of obtaining take-off lift the use of two front wheels would hardly be justifiable because so little load would rest on them; yet by having two front wheels instead of one, under the conditions here described, improved ground stability is obtained and more positive steering.

Such flap control for take-off purposes should be directly coordinated with the elevator so that when the airplane becomes air supported the elevator, as well as the flap, is in a position to hold the desired climbing attitude. At the same time, the simple coordinated control permits even a novice to hold both the flap and elevator in their minimum drag positions until they are needed for actual take-off. The process is further facilitated by using a low-drag type of flap, with a restricted angular movement, in combination with separate means for increasing the drag when desired independently of the lift.

An advantage of employing the front wheels 28 for steering purposes rather than the rear wheel or wheels, as is conventional practice, is that it makes it much easier for the pilot to dodge obstructions on the ground in that it moves the nose of the airplane away from the obstruction rather than pulling the tail over into a position where it might hit the obstruction. Furthermore, where the airplane in landing and in running along the ground is caught by a side gust of wind, the steerability of the front wheels enables the pilot to bring the airplane into the wind quicker and the reaction of the wind on the wings makes the airplane more quickly responsive in righting itself than in cases where it is attempted to swing the tail around to control such movements.

As previously mentioned instead of employing two brake pedals as illustrated in Fig. 3 and a separate master cylinder for each, it is possible to employ a single brake pedal and a single master cylinder and still obtain many of the advantages obtained by the dual construction with a further gain in the simplicity of control. The use of the single pedal and single master brake cylinder is illustrated in Fig. 6 in which the only change is in connection with this feature. Accordingly, in Fig. 6 all of the parts corresponding to the parts illustrated in Fig. 3 are illustrated by the same numerals and a specific description of each thereof is, therefore, unnecessary. Referring to Fig. 6 it will be noted that instead of employing a pair of master brake cylinders 210 a single master brake cylinder 210' is employed which may be identical to the master cylinder 210 previously described except possibly being desirably of slightly larger capacity. Conduits 212' extend from the master brake cylinder 210' to the wheel cylinders 208 for both front wheels 28 as well as to the rear wheel brakes when employed. A single brake pedal 280 is employed in this case pivotally mounted about a horizontal and spanwise directed axis 282. The pedal 280 is provided with a downwardly extending arm 206' equivalent to the arms 206 previously described and cooperating with a suitable fixed stop 216' for limiting rearward movement of the pedal 280. In this case the pedal 280 has fixed thereto for equal rotation therewith a pair of upwardly extending arms 220' each of which carries at its upper end a sprocket 194, which sprockets 194 may be the same sprockets previously described and which receive the corresponding cables 186. As will be readily appreciated with this modified form of construction depression of the brake pedal 280 will cause simultaneous application of the brakes on both sides of the airplane through actuation of the master cylinder 210'. Thus it is not possible with this construction to apply the brakes on one side of the airplane independently of those on the other. Furthermore with the construction illustrated in Fig. 6 any brake application through depression of the brake pedal 280 will cause simultaneous outward and opposed movement of the trailing edges of the rudders 22. Turning of the control wheel 46 will cause like pivotal movement of the rudders 22 about their pivotal axes regardless of whether or not they have previously been moved away from each other by depression of the brake pedal 280. It will also be appreciated that with the construction illustrated in Fig. 6 one rudder 22 cannot be turned independently of the other rudder 22 during the brake application as is possible in the construction illustrated in Fig. 3. The remaining advantages of construction illustrated in Fig. 3 are, of course, present in the construction illustrated in Fig. 6.

Having thus described my invention what I claim by Letters Patent is:

1. In an airplane, in combination, a fuselage, a pair of legs pivotally secured to said fuselage and directed downwardly therefrom, a knuckle member pivotally mounted on the lower end of each of said legs for movement about a vertically extending axis, a spindle on each of said knuckle members, a wheel rotatably mounted upon each of said spindles, a gear segment fixed to each of said knuckle members, a worm rotatably carried by each of said legs in meshing engagement with the corresponding one of said gear segments, a sprocket fixed to each of said worms for equal rotation therewith, a rotatable control member, a pair of sprockets fixed to said rotatable control member for equal rotation therewith, and endless power transmission means connecting one of said last mentioned sprockets with one of said first mentioned sprockets and the other of said last mentioned sprockets with the other of said first mentioned sprockets.

2. In an airplane, in combination, a pair of pivotally mounted rudders, yieldable means interconnecting said rudders, a single control member, means interconnecting said control member and said rudders operable to cause pivotal movement of said rudders in the same direction about their pivotal axes, pedal operated means cooperable with the last mentioned means operable to cause yielding of said yieldable means and relative movement of said rudders in opposite directions of movement about their pivotal axes, a steerable supporting wheel adapted for ground contact, means interconnecting said control member with said wheel for effecting steering movement thereof, a brake for said wheel, and a connection between said pedal operated means and said brake for applying said brake.

3. In an airplane, in combination, a pair of pivotally mounted rudders, means including a yieldable element operatively connecting unlike sides of said rudders, a movable control member, a pair of linearly movable means interconnecting said control member with the remaining sides of said rudders and movable by said control means in opposite directions of movement to effect turning movement of said rudders in the same direction of rotation about their pivotal axes, ground wheels including a wheel steerable by means of said control member, braking means for said ground wheels, pedal means for controlling said braking means, and means interconnecting said pedal means with said linearly movable means operable to effect movement of said linearly movable means independently of movement of said control member.

4. In an airplane, in combination, a pair of pivotally mounted laterally spaced rudders, means including a yieldable element operatively connecting unlike sides of said rudders, a movable control member, a pair of linearly movable means interconnecting said control member with the remaining sides of said rudders and movable by said control means in opposite directions of movement to effect turning movement of said rudders in the same direction of rotation about their pivotal axes, ground wheels including a wheel steerable by means of said control member, braking means for said ground wheels, pedal means for controlling said braking means, and means interconnecting said pedal means for simultaneous movement with both of said linearly movable means whereby to effect movement of the latter in the same direction independently of movement of said control member.

5. In an airplane, in combination, a pair of pivotally mounted laterally spaced rudders, means including a yieldable element operatively connecting unlike sides of said rudders, a movable control member, a pair of linearly movable means interconnecting said control member with the remaining sides of said rudders and movable by said control means in opposite directions of movement to effect turning movement of said rudders in the same direction of rotation about their pivotal axes, ground wheels including a pivotally mounted wheel forward of the center of gravity, braking means for said ground wheels, a pair of brake pedals, means operatively interconnecting each of said brake pedals with the braking means on the corresponding side of said airplane, and means interconnecting each of said brake pedals with that one of said linearly movable means extending to the rudder on the corresponding side of said airplane whereby to enable said linearly movable means to be operated independently of movement of said control member.

6. In an airplane, in combination, a pair of rudders, a pair of ground wheels, braking means for said ground wheels, a control member, means interconnecting said control member and said rudders for effecting simultaneous movement of said rudders in the same direction about their pivotal axes, means connecting said control member and said ground wheels for effecting steering movement of said ground wheels simultaneously with movement of said rudders in the same direction of movement about their pivotal axes, a pair of brake pedals, means operatively connecting said brake pedals with the braking means for said wheels, means connecting one of said pedals with one of said rudders, and means connecting the other of said pedals with the other of said rudders, the last two mentioned means being operative to effect movement of said rudders upon movement of the corresponding of said pedals independently of movement of said control member.

RALPH H. UPSON.